(12) United States Patent
Fierle et al.

(10) Patent No.: US 6,257,318 B1
(45) Date of Patent: Jul. 10, 2001

(54) BASKET DESIGN AND MEANS OF ATTACHMENT FOR HORIZONTAL AIR PREHEATERS

(75) Inventors: Kurt M. Fierle; Vong Boussa, both of Wellsville, NY (US)

(73) Assignee: ABB Alstom Power N.V., Amsterdam (NL)

(*) Notice: Subject to any disclaimer, the term of this patent is extended or adjusted under 35 U.S.C. 154(b) by 0 days.

(21) Appl. No.: 09/615,228

(22) Filed: Jul. 13, 2000

(51) Int. Cl.⁷ .................................................. F23L 15/02
(52) U.S. Cl. ........................................ 165/8; 165/10; 165/4
(58) Field of Search ............................... 165/4, 6, 8, 9, 165/10; 122/1 A

(56) References Cited

U.S. PATENT DOCUMENTS

| | | | |
|---|---|---|---|
| 3,799,241 | * | 3/1974 | Schluter et al. ................... 165/4 |
| 3,891,029 | * | 6/1975 | Mahoney ........................... 165/9 |
| 3,915,220 | * | 10/1975 | Gibson ............................. 165/8 |
| 4,418,742 | * | 12/1983 | Conde et al. ..................... 165/10 |
| 4,960,166 | * | 10/1990 | Hirt ................................ 165/10 |
| 5,915,340 | * | 6/1999 | Cronin et al. .................... 165/9 |
| 6,155,334 | * | 12/2000 | Steele .............................. 165/10 |

* cited by examiner

Primary Examiner—Ira S. Lazarus
Assistant Examiner—Terrell McKinnon
(74) Attorney, Agent, or Firm—Alix, Yale & Ristas, LLP

(57) ABSTRACT

A heat transfer element basket assembly for a rotary regenerative heat exchanger having a basket framework including oppositely disposed first and second side shells, means for holding the side shells in a spaced relationship, and heat absorbent material is disposed within the framework. The inboard end portions of first and second substantially planar flange plates are mounted to the outboard end portions of the first and second side shells, respectively. The outboard end portions of the first and second flange plates are each mounted to an adjacent diaphragm plate to install the basket assembly in the heat exchanger rotor. The first and second side shells of the basket assemblies define an angle therebetween which is substantially equal to the angle of the diaphragm plates. The outboard end portions of the first and second flange plates may be mounted to a diaphragm plate by bolting, welding or a combination where one of the flange plates is bolted and the other flange plate is welded.

14 Claims, 8 Drawing Sheets

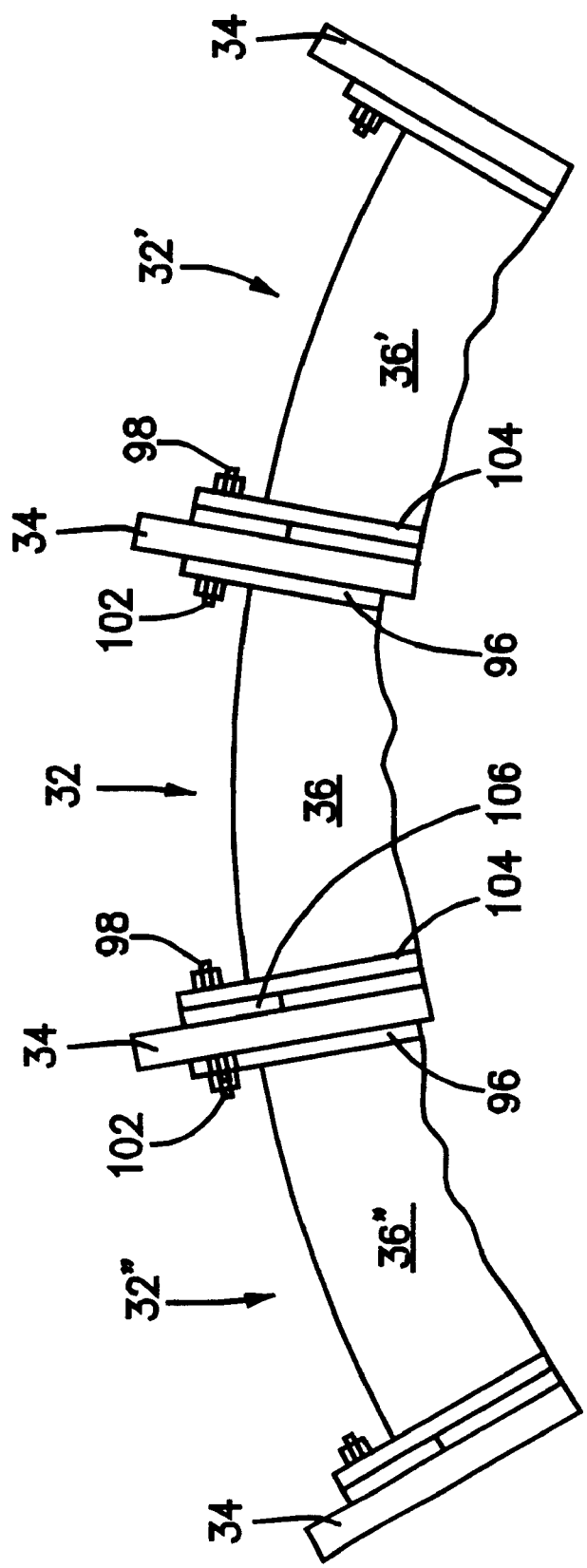

BASKET DESIGN AND MEANS OF ATTACHMENT FOR HORIZONTAL AIR PREHEATERS

BACKGROUND OF THE INVENTION

The present invention relates generally to rotary regenerative heat exchangers. More particularly, the present invention relates to heat exchange baskets, which contain heat absorbent material, for rotary regenerative heat exchangers.

A rotary heat exchanger is employed to transfer heat from one hot gas stream, such as a flue gas stream, to another cold gas stream, such as combustion air. The rotor contains a mass of heat absorbent material which is first positioned in a passageway for the hot gas stream where heat is absorbed by the heat absorbent material. As the rotor turns, the heated absorbent material enters the passageway for the cold gas stream where the heat is transferred from the absorbent material to the cold gas stream.

In a typical rotary heat exchanger, such as a rotary regenerative air preheater, the cylindrical rotor is disposed on a vertical central rotor post and divided into a plurality of sector-shaped compartments by a plurality of radial partitions or diaphragms extending from the rotor post to the outer peripheral shell of the rotor. These sector-shaped compartments are loaded with heat exchange baskets which contain the mass of heat absorbent material commonly comprised of stacked plate-like elements.

In many conventional horizontal rotary heat exchangers having full sector heat exchange baskets, the baskets are attached to the rotor by a formed flange. The formed flange is bent to an included angle of less than 90° and has one end portion mounted to the side of the basket and another end portion which is bolted to a shell bar. The flange is subjected to high bending stresses and to fatigue loading as the rotor rotates and is therefore subject to failure later in life. The nature of the formed flange design does not allow for the optimization of frontal area for heat transfer surface. Installation of shell bars for mounting the full sector heat exchange baskets, along with the associated gussets and filler pieces to reduce bypass flow, is very time consuming either in the manufacture of a new rotor, or the modification of an existing rotor.

SUMMARY OF THE INVENTION

Briefly stated, the invention in a preferred form is a heat transfer element basket assembly for a rotary regenerative heat exchanger which has a plurality of diaphragm plates which divide the rotor into a plurality of sector-shaped compartments. The basket assembly includes heat absorbent material is disposed within a basket framework. The basket framework includes oppositely disposed first and second side shells and means for holding the side shells in a spaced relationship. The inboard end portions of first and second substantially planar flange plates are mounted to the outboard end portions of the first and second side shells, respectively. The outboard end portions of the first and second flange plates are mounted to an adjacent diaphragm plate to install the basket assembly in the rotor.

The diaphragm plates are at a selected angle to each other to form a plurality of substantially identical compartments. The first and second side shells of the basket assemblies define an angle therebetween. The angle defined by the first and second side shells is substantially equal to the angle of the diaphragm plates.

The inboard end portion of the first and second flange plates are welded to the outboard end portions of the first and second side shells, respectively. The outboard end portions of the first and second flange plates may be mounted to a diaphragm plate in three ways. The outboard end portion of each flange plate and the outboard end portion of each diaphragm plate may each have at least one opening, such that each flange plate is mounted to the adjacent diaphragm plate by at least one bolt and nut. The outboard end portion of each flange plate may mounted to the adjacent diaphragm plate by a weld. One of the flange plates of each basket assembly may be mounted to a diaphragm plate by a nut and bolt while the other flange plate is mounted to a diaphragm plate by a weld.

It is an object of the invention to provide a new and improved heat transfer element basket assembly for a rotary regenerative heat exchanger.

It is also an object of the invention to provide methods of mounting the inventive heat transfer element basket assembly within the rotor of a rotary regenerative heat exchanger which provide flexibility of installation and removal.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIGS. 6a, 6b, 6c and 6d are top views of sections of the outboard portion of the rotor of FIG. 1 illustrating the installation of heat exchange baskets in accordance with the present invention by bolting.

DETAILED DESCRIPTION OF THE PREFERRED EMBODIMENT

Figure 1:
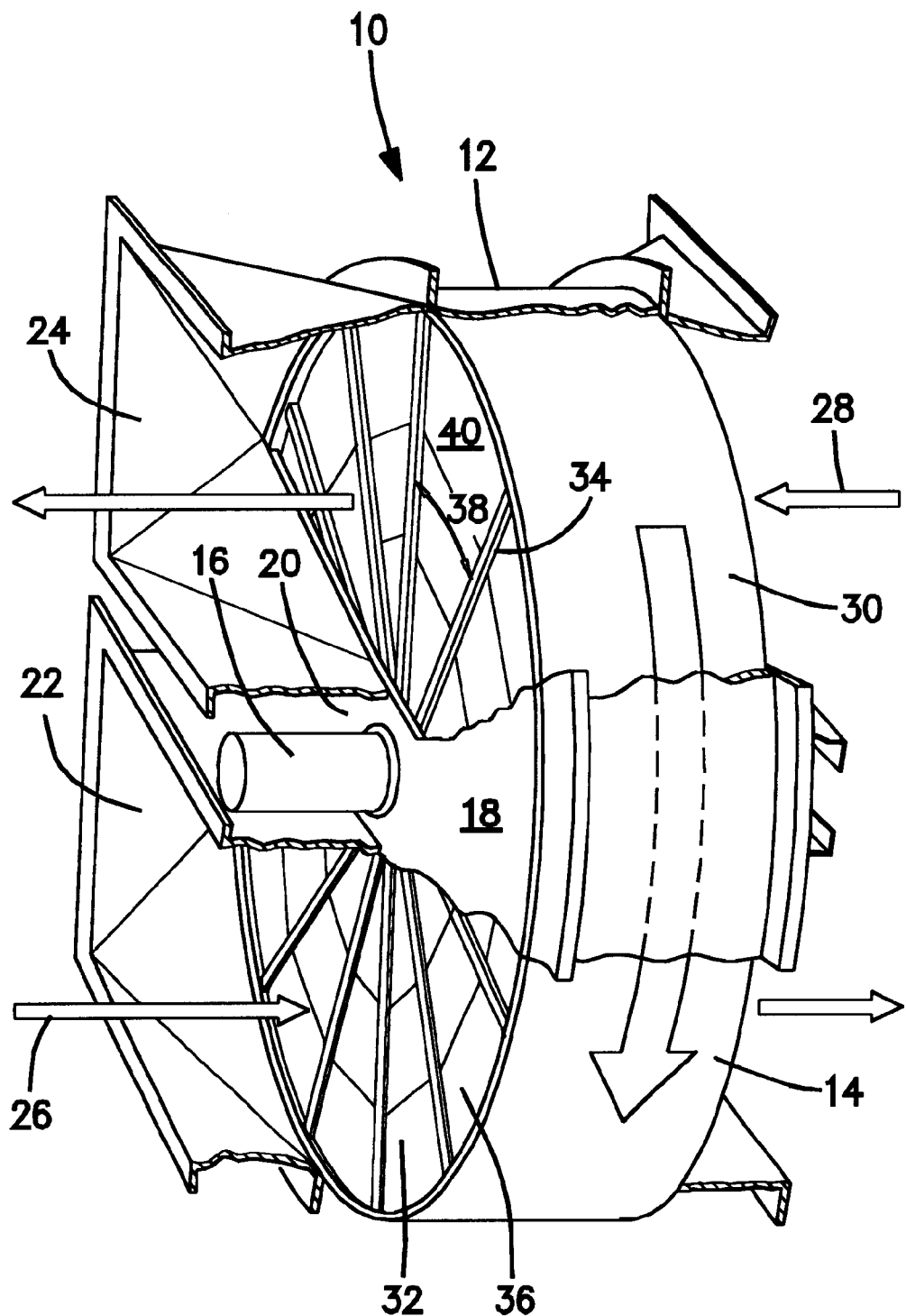
FIG. 1 is a general perspective view of a horizontal rotary regenerative air preheater.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plates 18 and 20 into a flue gas sector 22 and an air sector 24. Corresponding sector plates are also located on the bottom of the unit. The hot flue gases enter the air preheater 10 as indicated by the arrow 26, flow through the flue gas sector 22 where heat is transferred to the heat transfer surface in the rotor 14. As this hot heat transfer surface then rotates through the air sector 24, the heat is transferred to the air flowing through the rotor from the bottom as indicated by the arrow 28.

The rotor 14 has a shell 30 and is divided into a plurality of pie-shaped compartments 32 by the diaphragm plates 34 with each compartment containing at least one heat exchange basket 36. As shown in FIG. 1, the diaphragm plates 34 of each compartment define an obtuse angle 38.

Figure 2:
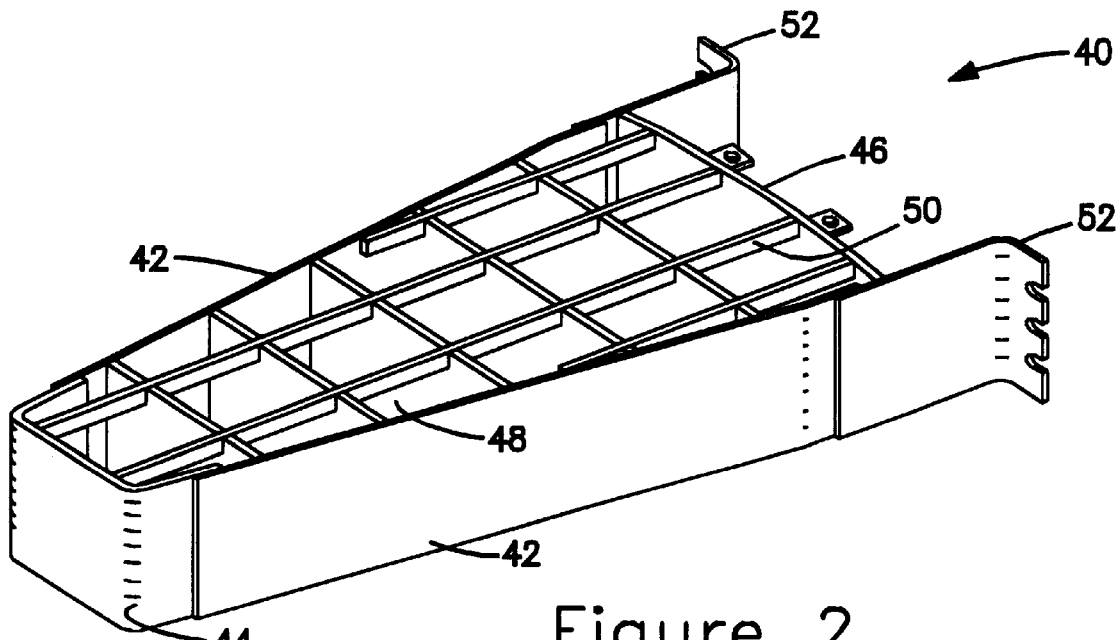
FIG. 2 is a perspective view of a prior art full sector heat exchange basket, with the heat exchange plates removed.

FIG. 2 illustrates a single prior art, formed flange, full sector heat transfer element basket 40, with the heat transfer plates removed. These full sector baskets 40 were developed to reduce the number of baskets required in each compartment. In some instances as many as ten or more baskets were replaced by a single basket. This resulted in tremendous labor savings for basket replacement.

Conventional formed flange baskets 40 typically comprise oppositely disposed side shells 42 which are joined at their inboard ends by a basket nose 44 and at their outboard ends by a basket cover 46. Pressure plates 48 extend laterally across the basket 40 and basket bars 50 extend longitudinally across the basket 40 to provide additional mechanical integrity to the basket, 40. A formed flange 52 extends longitudinally from the outboard end of each side shell 42. Heat exchange material 53 is disposed within the basket 40.

Figure 3:
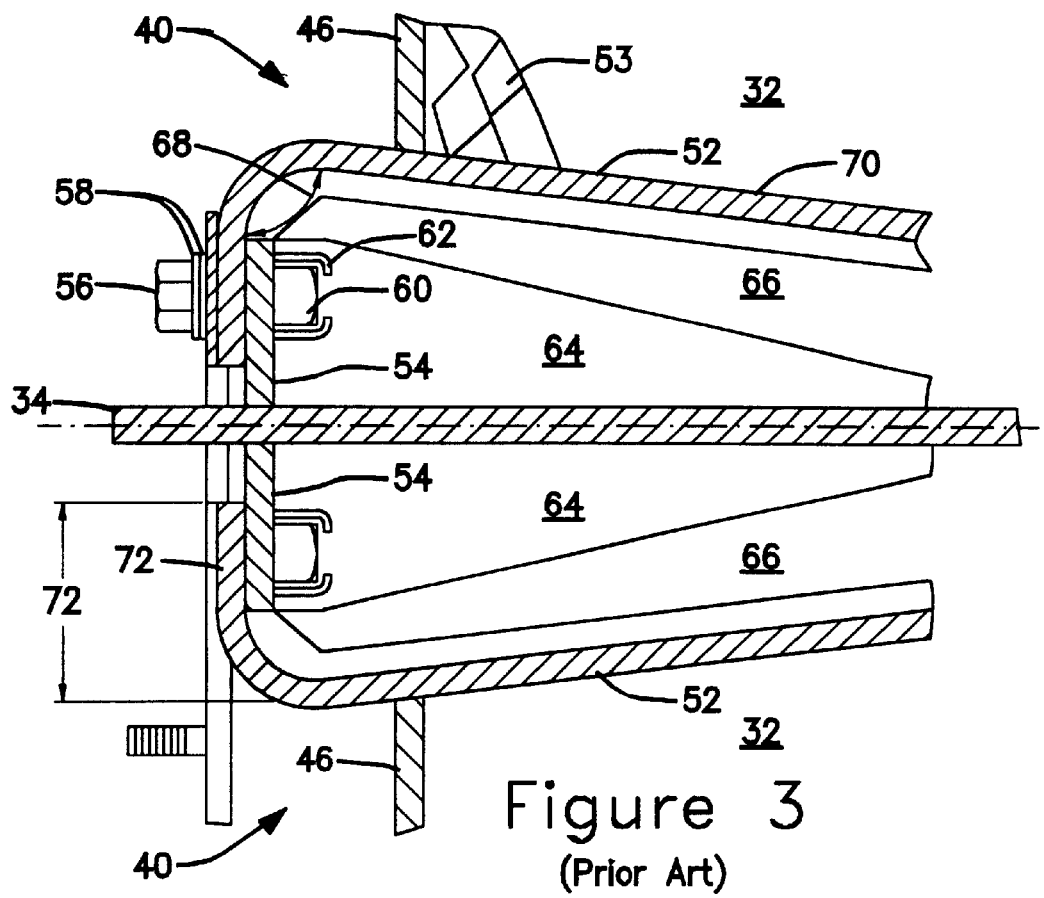
FIG. 3 is top view of the outboard portion of a rotor having a pair of the prior art full sector heat exchange baskets of FIG. 2 mounted within adjacent compartments.

With reference to FIG. 3, the baskets 40 are loaded into an empty rotor compartment 32 which is in the 12:00 o'clock position. The basket 40 is lowered into place until the formed flanges 52 rest on shell bar assemblies 54 which are welded to the diaphragm plates 34. Each of the formed flanges 52 is mounted to a shell bar assembly 54 by a bolt 56 which extends through openings in the formed flange 52 and the shell bar assembly 54 and a spherical washer 58 to engage a nut 60 housed within a nut cage 62, which is a part of the shell bar assembly. A gusset 64 and a filler piece 66 are welded to the shell bar assembly 54 on each side of the diaphragm plate 34 to reduce the air/gas flow bypass area around the basket 40.

The angle 68 between the longitudinal extension portion 70 of the formed flange 52 and the laterally extending leg 72 of the formed flange 52 can vary between 75° and 86.25°. The length 74 of leg 72 can exceed four (4) inches. This construction causes some very high stresses at the bolted connection due to loading on the leg 72.

The length 74 of leg 72 and angle 68 determine the amount of bypass area which must be blocked by the filler piece. If for example, angle 68 is 86.25° and length 74 is four inches, the total bypass area in each compartment is approximately 244 square inches. Since this bypass area does not contain any heat exchange materials, the size of the bypass area can represent a significant reduction of thermal performance and a significant increase in pressure drop.

Figure 4:
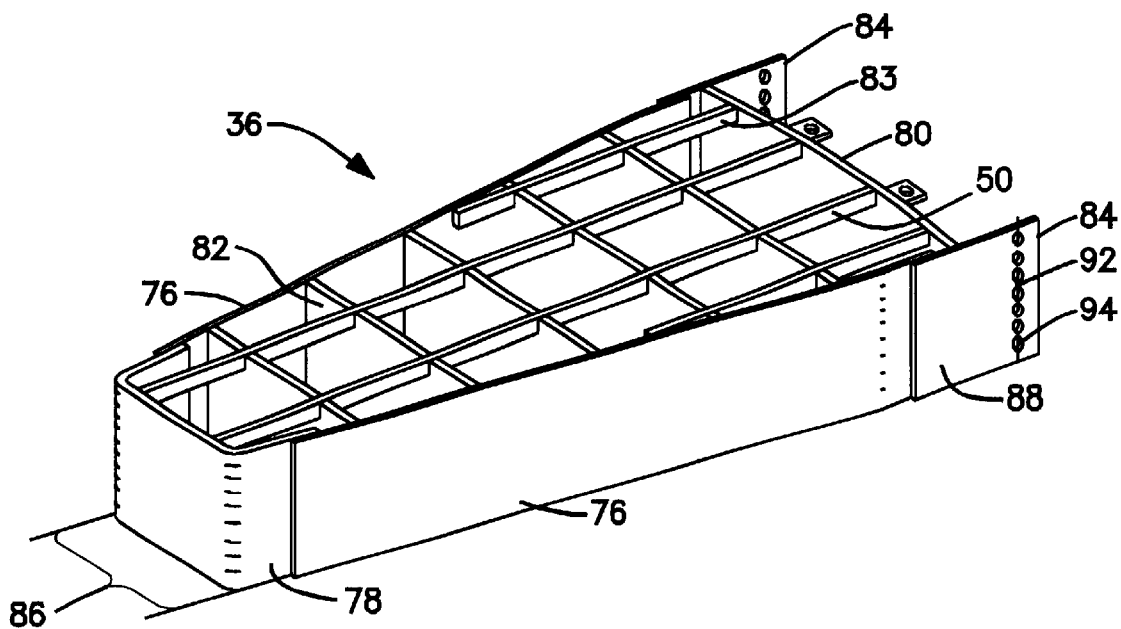
FIG. 4 is a perspective view of a full sector heat exchange basket, in accordance with the present invention, with the heat exchange plates removed.
Figure 5:
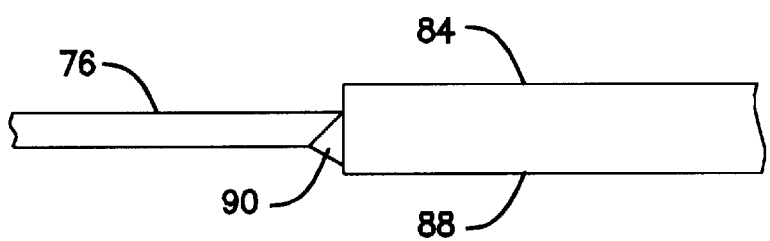
FIG. 5 is an enlarged top view of the side shell and flange plate of FIG. 4, illustrating the weld connection therebetween.

With reference to FIGS. 4 and 5, a heat exchange basket 36 in accordance with the invention includes oppositely disposed side shells 76 which are joined at their inboard ends by a basket nose 78 and at their outboard ends by a basket cover 80. Pressure plates 82 extend laterally across the basket 36 and basket bars 83 extend longitudinally across the basket 36 to provide additional mechanical integrity to the basket 36. A flat, flange plate 84 extends longitudinally from the outboard end of each side shell 76.

The basket 36 is constructed such that the angle 86 defined between the two side shells 76 of the basket 36 is substantially the same as the angle 38 defined between the diaphragm plates 34 forming the compartment 32, with only a small nominal clearance. The inboard end portion 88 of the flange plate 84 is welded to the side shell 76 with a full penetration weld 90. The outboard end portion 92 of the flange plate 84 has holes 94 in it which may be used to attach the basket 36 to the rotor 14.

There are three different methods for mounting the heat exchange basket 36 may be attached to the rotor 14. In the first method, the flange plates 84 are bolted to the rotor 14, utilizing the holes 94 in the flange plate 84. In the second method, the flange plates 84 are welded to the rotor 14. In the third method, one of the flange plates 84 is bolted to the rotor 14 and the other flange plate 84 is welded to the rotor 14. Of the three methods, the first method requires the longest installation period. However, should the heat exchange baskets 36 ever require removal, the first method requires the shortest removal period. The second method requires the shortest installation period but the longest removal period. As would be expected, the installation period for the third method is shorter than that of the first method and longer than that of the second period and the removal period for the third method is longer than that of the first method and shorter than that of the second method.

Figure 6A:
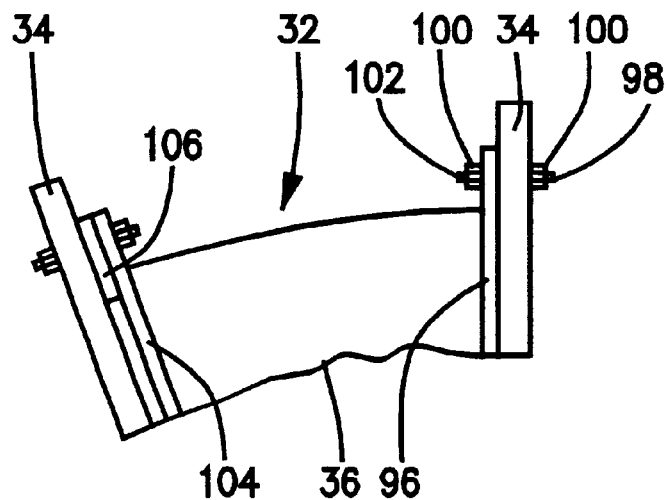

To install the heat exchange baskets 36 using the first method (bolting), an empty compartment 32 is positioned at the 12:00 o'clock position and the first basket 36 is lowered into place (FIG. 6a). A first 96 of the two flange plates 84 is then bolted to the adjacent diaphragm plate 34, which is shy of the 12:00 o'clock position with a bolt 98, washers 100, and nut 102. It is intended that no shims need to be used between the first flange plate 96 and the diaphragm plate 34. The second flange plate 104 is then shimmed 106 as necessary and bolted to the adjacent diaphragm plate 34.

Figure 6B:
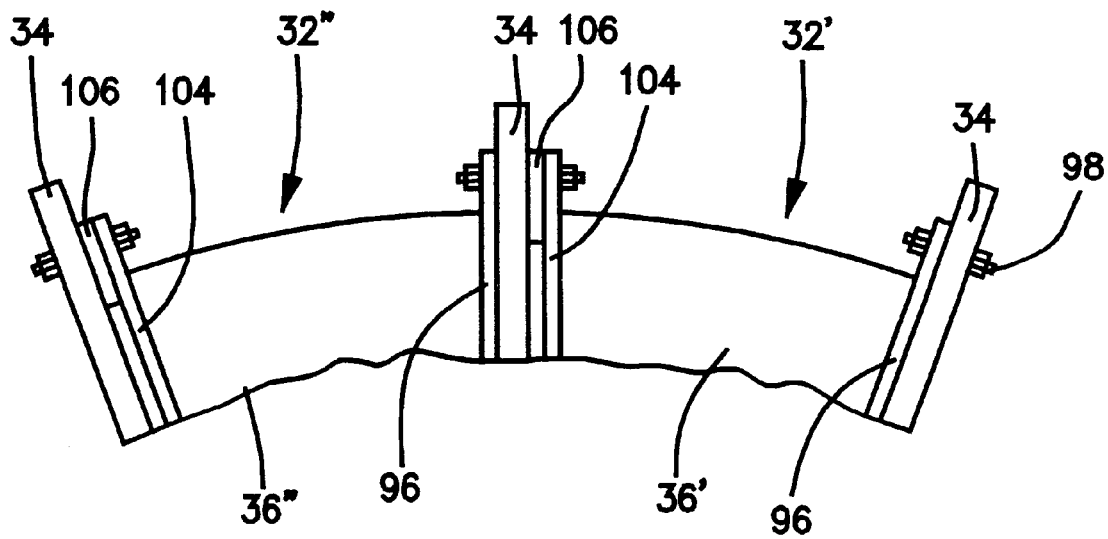

The rotor 14 is then rotated 1800 and a second basket 36' is lowered into an empty compartment 32' (FIG. 6b). Similar to the first basket 36, a first 96 of the two flange plates 84 is bolted to the adjacent diaphragm plate 34 without the use of shims. The rotor 14 is then moved such that the adjacent empty compartment 32" is at the 12:00 o'clock position. A third basket 36" is lowered into place, the unbolted second flange plate 104 of the second basket 36' is shimmed 106 as necessary, and the second flange plate 104 of the second basket 36' and the first flange plate 96 of the third basket 36" are bolted to the diaphragm plate 34 disposed therebetween. Similar to the first and second baskets, the first flange plate 96 of the third basket 36" to be mounted to the rotor 14 is mounted without the use of shims.

The rotor 14 is again rotated approximately 180° to install two more baskets (not shown) adjacent the first basket 36. Installing the baskets 36 in this manner helps keep the rotor 14 balanced. This process is continued until all the baskets 36 are installed. It should be understood that during this process some of the bolting will need to be redone as adjacent baskets are installed and it is possible to deviate from the sequence described above.

For example, depending on the number of compartments, there will be either one or two empty compartments at the end of the installation process. A single remaining empty compartment 32 (FIG. 6c) is positioned at the 12:00 o'clock position and the bolting 98, 102 mounting the basket 36', 36" in each adjacent full compartment 32', 32", to the diaphragm plate 34 which is common to the empty compartment 32 is removed. A basket assembly 36 is lowered into the single remaining compartment 32 and the first flange plate 96 of the basket assembly 36 in the single remaining compartment 32 and the second flange plate 104 of the basket assembly 36' in the adjacent full compartment 32' are bolted to the shared common diaphragm plate 34. One or more shims 106 are inserted between the second flange plate 104 of the basket assembly 36 in the single remaining compartment 32 and the shared common diaphragm plate 34, if necessary and the second flange plate 104 of the basket assembly 36 in the single remaining compartment 32 and the first flange plate 96 of the basket assembly 36" in the adjacent full compartment 32" are bolted to the shared common diaphragm plate 34.

Figure 6D:
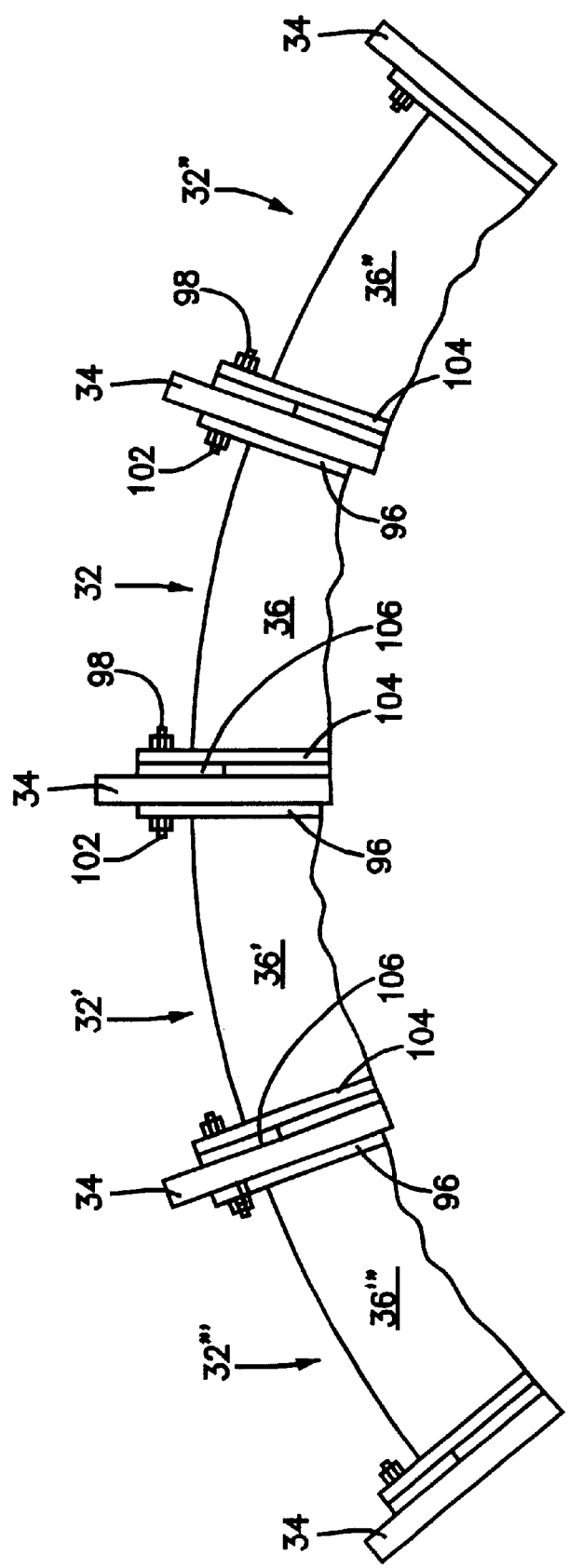

If two empty compartments remain (FIG. 6d), a first 32 of two adjacent empty compartments 32, 32' is positioned at the 12:00 o'clock position and the bolting 98, 102 mounting the basket 36", 36'" in each adjacent full compartment 32", 32'" to the diaphragm plate 34 which is common to one of the empty compartments 32, 32' is removed. A basket assembly 36 is lowered into the first compartment 32. The first flange plate 96 is bolted to the diaphragm plate 34 of the first compartment 32' if the adjacent compartment 32 is empty. The first flange plate 96 of the basket assembly 36 in the first compartment 32 and the second flange plate 104 of the basket assembly 36" in the adjacent full compartment 32" are bolted 98, 102 to the shared common diaphragm plate 34 if the adjacent compartment 32" is full. The rotor 14 is rotated to position the second compartment 32' at the 12:00 o'clock position and a basket assembly 36' is lowered into the second compartment 32'. One or more shims 106 is inserted between the second flange plate 104 of the basket assembly 36 in the first compartment 32 and the common diaphragm plate 34, if necessary and the second flange plate 104 of the basket assembly 36 in the first compartment 32 and the first flange plate 96 of the basket assembly 36' in the second compartment 32' are bolted to the common diaphragm plate 34. One or more shims 106 are inserted between the second flange plate 104 of the basket assembly 36' in the second compartment 32' and the diaphragm plate 34, if necessary. The second flange plate 104 is bolted to the diaphragm plate 34 of the second compartment 32 if the adjacent compartment 32' is empty. The second flange plate 104 of the basket assembly 36' in the second compartment 32' and the first flange plate 96 of the basket assembly 36'" in the adjacent full compartment 32'" are bolted to the shared common diaphragm plate 34 if the adjacent compartment 32'" is full.

Figure 7A:
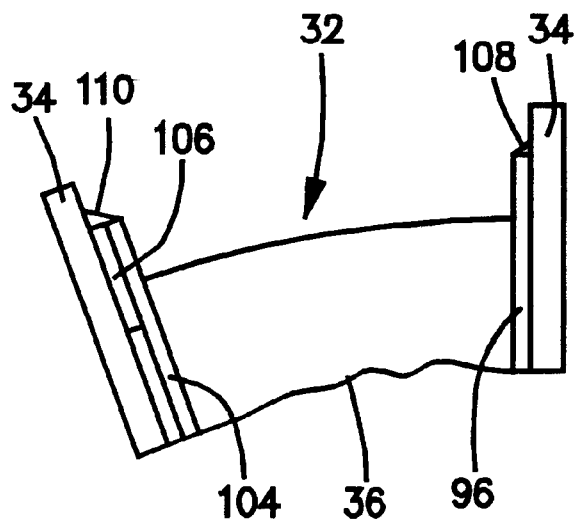
FIGS. 7a and 7b are top views of sections of the outboard portion of the rotor of FIG. 1 illustrating the installation of heat exchange baskets in accordance with the present invention by welding.

To install the heat exchange baskets 36 using the second method (welded), an empty compartment 32 is positioned at the 12:00 o'clock position and the first basket 36 is lowered into place (FIG. 7a). A first 96 of the two flange plates 84 is then welded 108 to the adjacent diaphragm plate 34, which is shy of the 12:00 o'clock position. It is intended that no shims need to be used between the first flange plate 96 and the diaphragm plate 34. The second flange plate 104 is then shimmed 106 as necessary and welded 110 to the adjacent diaphragm plate 34.

Figure 7B:
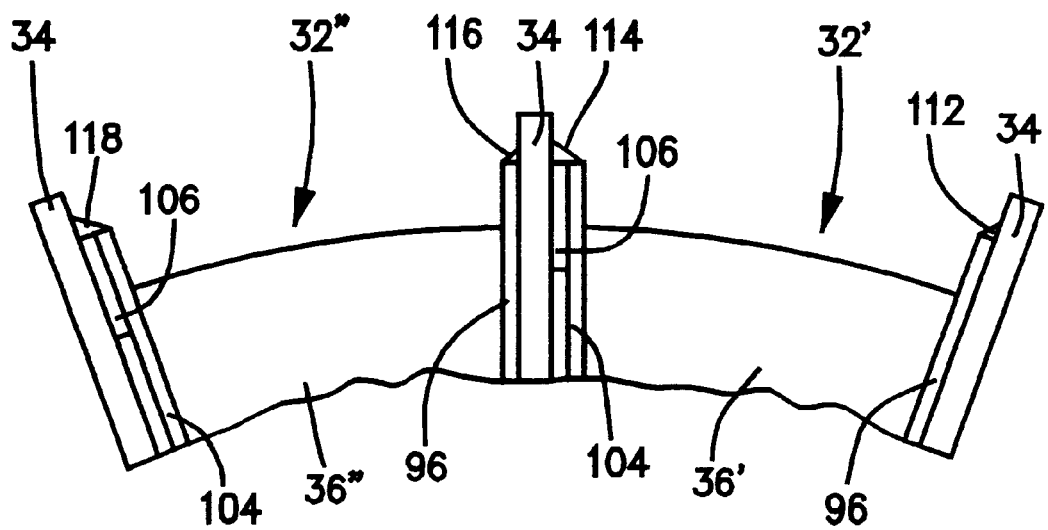
Figure 8A:
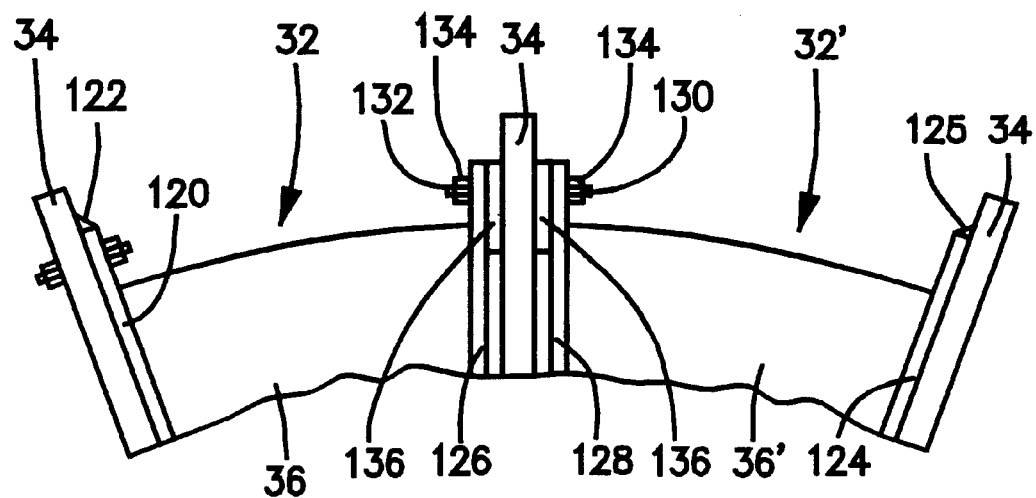
FIGS. 8a and 8b are top views of sections of the outboard portion of the rotor of FIG. 1 illustrating the installation of heat exchange baskets in accordance with the present invention by bolting and welding.
Figure 8B:
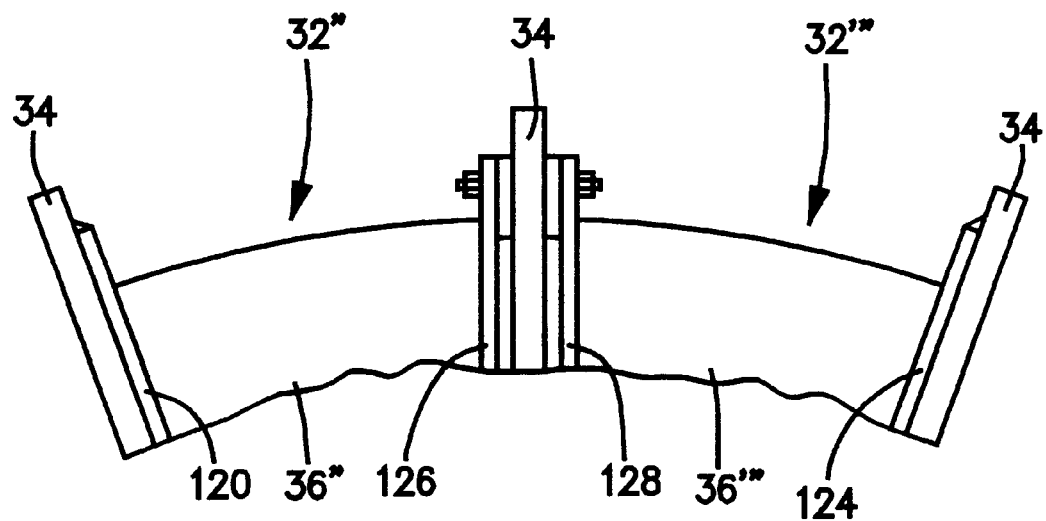

The rotor 14 is then rotated 180° and a second basket 36' is lowered into an empty compartment 32' (FIG. 7b). Similar to the first basket 36, a first 96 of the two flange plates 84 is welded 112 to the adjacent diaphragm plate 34 without the use of shims and the second 104 of the two flange plates 84 is shimmed 106 as necessary and welded 114 to the adjacent diaphragm plate 34. The rotor 14 is then moved such that the adjacent empty compartment 32" is at the 12:00 o'clock position. A third basket 36" is lowered into place, a first 96 of the two flange plates 84 is welded 116 to the adjacent diaphragm plate 34 without the use of shims and the second 104 of the two flange plates 84 is shimmed 106 as necessary and welded 118 to the adjacent diaphragm plate 34.

The rotor 14 is again rotated approximately 180° to install two more baskets (not shown) adjacent the first basket 36. Installing the baskets in this manner helps keep the rotor balanced. This process is continued until all the baskets are installed. Based on rotor size, basket size, and basket configurations in the rotor, it is possible to deviate from the sequence described above.

To install the heat exchange baskets 36 using the third method (one flange welded and one flange bolted), an empty compartment 32 is positioned at the 12:00 o'clock position and the first basket 36 is lowered into place. A first 120 of the two flange plates 84 is then welded 122 to the adjacent diaphragm plate 34, which is shy of the 12:00 o'clock position. It is intended that no shims need to be used between the first flange plate 120 and the diaphragm plate 34. The rotor 14 is then rotated to the adjacent compartment 32', moving the first basket 36 towards 11:00 o'clock. A second basket 36' is lowered into place and the first flange plate 124 is welded 125 to the adjacent diaphragm plate 34, which is towards the 1:00 o'clock position. This leaves the second flange plate 126 of the first basket 36 and the second flange plate 128 of the second basket 36' unfastened. These flange plates 126, 128 are fastened to the diaphragm plate 34 disposed between them, using a bolt 130, a nut 132, washers 134 and shims 136.

The rotor 14 is rotated 180° and third and fourth baskets 36" 36'" are mounted to the rotor 14 in an identical manner as the first and second baskets 36, 36'. This process is repeated until all the baskets are installed. Based on rotor size, basket size, and basket configurations in the rotor, it is possible to deviate from the sequence described above.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A heat transfer element basket assembly for a rotary regenerative heat exchanger having a plurality of diaphragm plates, each diaphragm plate having an adjacent diaphragm plate defining an angle therebetween, the basket assembly comprising:

a basket framework including first and second side shells disposed at opposite sides of the basket and means attaching said first and second side shells in spaced relationship, each of the side shells having oppositely disposed inboard and outboard end portions;

means for absorbing heat disposed within the basket framework; and first and second flange plates, each of the flange plates having a substantially planar shape and oppositely disposed inboard and outboard end portions, the inboard end portions of the first and second flange plates being mounted to the outboard end portions of the first and second side shells, respectively, the outboard end portions of the first and second flange plates being adapted for mounting to a diaphragm plate.

2. The heat transfer element basket assembly of claim 1 wherein the outboard end portion of each flange plate defines at least one opening.

3. The heat transfer element basket assembly of claim 1 wherein the inboard end portion of the first and second flange plates are welded to the outboard end portions of the first and second side shells, respectively.

4. The heat transfer element basket assembly of claim 1 wherein the first and second side shells define an angle therebetween, the angle defined by the first and second side shells being substantially equal to the angle defined by the diaphragm plate and the adjacent diaphragm plate.

5. A rotor assembly for a rotary regenerative heat exchanger comprising:
   a plurality of diaphragm plates extending radially from an inboard end to an outboard end so as to divide the rotor into a plurality of sector-shaped compartments, each of the diaphragm plates having an outboard end portion; and
   a hat transfer element basket assembly disposed within each of the compartments, each basket assembly including
      a basket framework including first and second radially extending side shells, each of the side shells having an outboard end portion;
      means for absorbing heat disposed within the basket framework; and
      first and second substantially planar flange plates, each of the flange plates having inboard and outboard end portions, the inboard end portions of the first and second flange plates being mounted to the outboard end portions of the first and second side shells, respectively, the outboard end portions of the first and second flange plates being mounted to an adjacent diaphragm plate.

6. The rotor assembly of claim 5 wherein the inboard end portion of the first and second flange plates are welded to the outboard end portions of the first and second side shells, respectively.

7. The rotor assembly of claim 5 wherein the diaphragm plates are at a selected angle to each other and the first and second side shells define an angle therebetween, the angle defined by the first and second side shells being substantially equal to the angle of the diaphragm plates.

8. The rotor assembly of claim 5 further comprising a plurality of bolts and nuts, the outboard end portion of each flange plate and the outboard end portion of each diaphragm plate defining at least one opening, wherein each flange plate is mounted to the adjacent diaphragm plate by at least one of the bolts, the bolt extending through the openings of the flange plate and the adjacent diaphragm plate to engage one of the nuts.

9. The rotor assembly of claim 5 further comprising a plurality of welds, wherein the outboard end portion of each flange plate is mounted to the adjacent diaphragm plate by one of the welds.

10. The rotor assembly of claim 5 further comprising a plurality of bolts and nuts and a plurality of welds, and the outboard end portion of one of the flange plates of each basket assembly and the outboard end portion of the adjacent diaphragm plate each define at least one opening, wherein one of the bolts extends through each opening of the one flange plate and the opening in the adjacent diaphragm plate to engage one of the nut to mount the one flange plate to the adjacent diaphragm plate and the outboard end portion of another of the flange plates of each basket assembly is mounted to an adjacent diaphragm plate by one of the welds.

11. A method of mounting a heat transfer element basket assembly in a rotor assembly for a horizontal rotary regenerative heat exchanger, the rotor including a plurality of diaphragm plates extending radially from an inboard end to an outboard end so as to divide the rotor into a plurality of sector-shaped compartments, each of the diaphragm plates having an outboard end portion, each basket assembly including a basket framework having first and second radially extending side shells and first and second substantially planar flange plates, each of the side shells having an outboard end portion, each of the flange plates having inboard and outboard end portions, the inboard end portions of the first and second flange plates being mounted to the outboard end portions of the first and second side shells, respectively, the process comprising the steps of:
   a. positioning an empty compartment at the 12:00 o'clock position;
   b. lowering a basket assembly into the empty compartment;
   c. bolting the first flange plate to an adjacent diaphragm plate;
   d. inserting one or more shims between the second flange plate and an adjacent diaphragm plate if necessary;
   e. bolting the second flange plate to the adjacent diaphragm plate;
   f. rotating the rotor approximately 180° and positioning a first of two adjacent empty compartments at the 12:00 o'clock position, the first and second compartments sharing a common diaphragm plate and each having oppositely disposed side diaphragm plates;
   g. lowering a basket assembly into the first compartment;
   h. bolting the first flange plate to the side diaphragm plate of the first compartment;
   i. rotating the rotor to position the second compartment at the 12:00 o'clock position;
   j. lowering a basket assembly into the second compartment;
   k. inserting one or more shims between the second flange plate of the basket assembly in the first compartment and the common diaphragm plate, if necessary;
   i. bolting the second flange plate of the basket assembly in the first compartment and the first flange plate of the basket assembly in the second compartment to the common diaphragm plate; and
   m. repeating steps f-l until all of the empty compartments have a basket assembly installed therewithin.

12. The method of claim 11 wherein step m further comprises the substeps of:
   1. rotating the rotor approximately 180°, positioning the single remaining empty compartment at the 12:00 o'clock position, and completing steps 2–6, below or positioning a first of two adjacent empty compartments at the 12:00 o'clock position and completing steps 7–16, below, the single remaining empty compartment sharing common diaphragm plates with adjacent full compartments each having a basket assembly mounted therein, the first and second compartments sharing a common diaphragm plate and each having oppositely disposed side diaphragm plates, the side diaphragm plates of one or both of the first and second compartments being a common diaphragm plate shared with an adjacent full compartment having a basket assembly mounted therein;
   2. removing the bolting mounting the basket in each adjacent full compartment to the common diaphragm plate;
   3. lowering a basket assembly into the single remaining compartment;
   4. bolting the first flange plate of the basket assembly in the single remaining compartment and the second flange plate of the basket assembly in the adjacent full compartment to the shared common diaphragm plate;
   5. inserting one or more shims between the second flange plate of the basket assembly in the single remaining compartment and the shared common diaphragm plate, if necessary; and 6. bolting the second flange plate of the basket assembly in the single remaining compartment and the first flange plate of the basket assembly in the adjacent full compartment to the shared common diaphragm plate;
7. removing the bolting mounting the basket in each adjacent full compartment to the common diaphragm plate;
8. lowering a basket assembly into the first compartment;
9. bolting the first flange plate to the side diaphragm plate of the first compartment if the adjacent compartment is empty or bolting the first flange plate of the basket assembly in the first compartment and the second flange plate of the basket assembly in the adjacent full compartment to the shared common diaphragm plate if the adjacent compartment is full;
10. rotating the rotor to position the second compartment at the 12:00 o'clock position;
11. lowering a basket assembly into the second compartment;
12. inserting one or more shims between the second flange plate of the basket assembly in the first compartment and the common diaphragm plate, if necessary;
13. bolting the second flange plate of the basket assembly in the first compartment and the first flange plate of the basket assembly in the second compartment to the common diaphragm plate
14. inserting one or more shims between the second flange plate of the basket assembly in the second compartment and the side diaphragm plate, if necessary;
15. bolting the second flange plate to the side diaphragm plate of the second compartment if the adjacent compartment is empty or bolting the second flange plate of the basket assembly in the second compartment and the first flange plate of the basket assembly in the adjacent full compartment to the shared common diaphragm plate if the adjacent compartment is full; and
16. repeating steps 1–15 until all of the empty compartments have a basket assembly installed therewithin.

13. A method of mounting a heat transfer element basket assembly in a rotor assembly for a horizontal rotary regenerative heat exchanger, the rotor including a plurality of diaphragm plates extending radially from an inboard end to an outboard end so as to divide the rotor into a plurality of sector-shaped compartments, each of the diaphragm plates having an outboard end portion, each basket assembly including a basket framework having first and second radially extending side shells and first and second substantially planar flange plates, each of the side shells having an outboard end portion, each of the flange plates having inboard and outboard end portions, the inboard end portions of the first and second flange plates being mounted to the outboard end portions of the first and second side shells, respectively, the process comprising the steps of:

a. positioning an empty compartment at the 12:00 o'clock position;
b. lowering a basket assembly into the empty compartment;
c. welding the first flange plate to an adjacent diaphragm plate;
d. inserting one or more shims between the second flange plate and an adjacent diaphragm plate if necessary;
e. welding the second flange plate to an adjacent diaphragm plate;

f. rotating the rotor approximately 180° and positioning a first of two adjacent empty compartments at the 12:00 o'clock position, the first and second compartments sharing a common diaphragm plate and each having oppositely disposed side diaphragm plates;
g. lowering a basket assembly into the first compartment;
h. welding the first flange plate to the side diaphragm plate of the first compartment;
i. inserting one or more shims between the second flange plate and the common diaphragm plate if necessary;
j. welding the second flange plate to the common diaphragm plate;
k. rotating the rotor to position the second compartment at the 12:00 o'clock position;
l. lowering a basket assembly into the second compartment;
m. welding the first flange plate to the common diaphragm plate;
n. inserting one or more shims between the second flange plate and the side diaphragm plate of the second compartment, if necessary;
o. welding the second flange plate to the side diaphragm plate of the second compartment;
p. repeating steps f–o until all of the empty compartments have a basket assembly installed therewithin or until there is only a single remaining empty compartment, if there is a single remaining empty compartment, rotate the rotor approximately 180°, positioning the single remaining empty compartment at the 12:00 o'clock position; and
q. lower a basket assembly into the single remaining compartment;
r. weld the first flange plate to the side diaphragm plate of the single remaining compartment;
t. insert one or more shims between the second flange plate and the side diaphragm plate if necessary;
u. weld the second flange plate to the side diaphragm plate.

14. A method of mounting a heat transfer element basket assembly in a rotor assembly for a horizontal rotary regenerative heat exchanger, the rotor including a plurality of diaphragm plates extending radially from an inboard end to an outboard end so as to divide the rotor into a plurality of sector-shaped compartments, each of the diaphragm plates having an outboard end portion, each basket assembly including a basket framework having first and second radially extending side shells and first and second substantially planar flange plates, each of the side shells having an outboard end portion, each of the flange plates having inboard and outboard end portions, the inboard end portions of the first and second flange plates being mounted to the outboard end portions of the first and second side shells, respectively, the process comprising the steps of:

a. positioning a first of two adjacent empty compartments at the 12:00 o'clock position, the first and second compartments sharing a common diaphragm plate and each having oppositely disposed side diaphragm plates;
b. lowering a basket assembly into the first compartment;
c. welding the first flange plate to the side diaphragm plate of the first compartment;
d. rotating the rotor to position the second compartment at the 12:00 o'clock position;
e. lowering a basket assembly into the second compartment;

f. welding the second flange plate to the side diaphragm plate of the second compartment;

g. inserting one or more shims between the second flange plate of the basket in the first compartment and the common diaphragm plate, if necessary;

h. inserting one or more shims between the first flange plate of the basket in the second compartment and the common diaphragm plate, if necessary;

i. bolting the second flange plate of the basket in the first compartment and the first flange plate of the basket in the second compartment to the common diaphragm plate;

f. rotating the rotor approximately 180°; and p. repeating steps a–i until all of the empty compartments have a basket assembly installed therewithin.

* * * * *